United States Patent

Yamada et al.

(10) Patent No.: US 9,676,421 B2
(45) Date of Patent: Jun. 13, 2017

(54) WELDED STRUCTURE FOR VEHICLE BODY PANEL

(71) Applicant: HONDA MOTOR CO., LTD., Minato-ku, Tokyo (JP)

(72) Inventors: Takayuki Yamada, Wako (JP); Yuya Furusaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 219 days.

(21) Appl. No.: 14/410,635

(22) PCT Filed: Jun. 27, 2013

(86) PCT No.: PCT/JP2013/067701
§ 371 (c)(1),
(2) Date: Dec. 23, 2014

(87) PCT Pub. No.: WO2014/007145
PCT Pub. Date: Jan. 9, 2014

(65) Prior Publication Data
US 2015/0284028 A1  Oct. 8, 2015

(30) Foreign Application Priority Data

Jul. 2, 2012 (JP) ................................. 2012-148198

(51) Int. Cl.
*B25G 3/34* (2006.01)
*F16B 11/00* (2006.01)
(Continued)

(52) U.S. Cl.
CPC ........... *B62D 25/025* (2013.01); *B62D 25/04* (2013.01); *B62D 25/06* (2013.01); *B62D 25/08* (2013.01);
(Continued)

(58) Field of Classification Search
CPC .. Y10T 403/479; B62D 25/025; B62D 25/04; B62D 25/06; B62D 25/08; B62D 27/02;
(Continued)

(56) References Cited

U.S. PATENT DOCUMENTS 2,775,479 A * 12/1956 Balint ................... E05F 11/382
296/151
RE29,762 E * 9/1978 Becker ................. B23K 11/163
219/161
(Continued)

FOREIGN PATENT DOCUMENTS

JP   2000-272534 A   10/2000
JP   2006-160031 A    6/2006
(Continued)

OTHER PUBLICATIONS

Official Communications dated May 7, 2015 related to corresponding Japanese Application No. 2014-523704.

*Primary Examiner* — Michael P Ferguson
*Assistant Examiner* — Nahid Amiri
(74) *Attorney, Agent, or Firm* — Carrier Blackman & Associates, P.C.; William D. Blackman; Joseph P. Carrier

(57) ABSTRACT

A second joining flange formed along an edge of a second panel and a third joining flange formed along an edge of a third panel are superimposed on a first joining flange formed along an edge of a first panel, a seam weld is made in a section in which the first joining flange and the second joining flange form two layers and a section in which the first joining flange and the third joining flange form two layers, and a spot weld is made in a section in which the first joining flange, the second joining flange and the third joining flange form three layers. Such structure enhances production efficiency by increasing welding speed, and facilitates spot welding in the section having three layers, for which seam (Continued)

welding is difficult due to the large number of superimposed sheets, thereby enhancing strength against peel-off.

8 Claims, 11 Drawing Sheets

(51) Int. Cl.
| | |
|---|---|
| *F16B 12/04* | (2006.01) |
| *F16L 13/00* | (2006.01) |
| *B62D 25/02* | (2006.01) |
| *B62D 25/04* | (2006.01) |
| *B62D 25/06* | (2006.01) |
| *B62D 25/08* | (2006.01) |
| *B62D 27/02* | (2006.01) |
| *B23K 11/06* | (2006.01) |
| *B23K 101/00* | (2006.01) |
| *B23K 11/11* | (2006.01) |
| *B23K 11/087* | (2006.01) |
| *B23K 11/10* | (2006.01) |

(52) U.S. Cl.
CPC .............. *B62D 27/02* (2013.01); *B23K 11/06* (2013.01); *B23K 11/061* (2013.01); *B23K 11/087* (2013.01); *B23K 11/10* (2013.01); *B23K 11/11* (2013.01); *B23K 2201/006* (2013.01); *Y10T 403/479* (2015.01)

(58) Field of Classification Search
CPC .... B62D 27/023; B23K 11/06; B23K 11/061; B23K 11/087; B23K 11/10; B23K 11/11; B23K 2201/006
USPC .............................................. 403/272; 296/29
See application file for complete search history.

(56) References Cited

U.S. PATENT DOCUMENTS

| | | | | |
|---|---|---|---|---|
| 4,187,407 | A * | 2/1980 | Marko, Jr. ......... | B23K 11/0026 219/91.2 |
| 4,886,953 | A * | 12/1989 | Urech ................ | B23K 35/0205 219/64 |
| 7,325,865 | B2 | 2/2008 | Yamazaki | |
| 7,531,766 | B2 * | 5/2009 | Wang .................... | B23K 11/06 219/118 |
| 7,819,452 | B2 * | 10/2010 | Fuchs .................... | B23K 11/11 156/60 |
| 7,900,997 | B2 * | 3/2011 | Hosaka .................. | B62D 25/07 296/193.12 |
| 8,118,355 | B2 * | 2/2012 | Tamura .................. | B62D 25/02 296/209 |
| 8,215,708 | B2 * | 7/2012 | Gruneklee ............. | B62D 25/06 296/187.12 |
| 2009/0250439 | A1 * | 10/2009 | Workman .............. | B23K 11/06 219/78.02 |
| 2012/0013150 | A1 * | 1/2012 | Ogawa .................. | B62D 25/06 296/193.12 |
| 2012/0119544 | A1 * | 5/2012 | Mildner ............... | B62D 25/025 296/193.07 |
| 2012/0248825 | A1 * | 10/2012 | Tamura .................. | B62D 25/04 296/209 |
| 2012/0261951 | A1 * | 10/2012 | Mildner ................ | B62D 25/04 296/193.05 |

FOREIGN PATENT DOCUMENTS

| | | |
|---|---|---|
| JP | 2007-167895 A | 7/2007 |
| JP | 2009-255800 A | 11/2009 |
| JP | 2012-025335 A | 2/2012 |
| JP | 2012-110937 A | 6/2012 |
| JP | 2013-203266 A | 10/2013 |

* cited by examiner

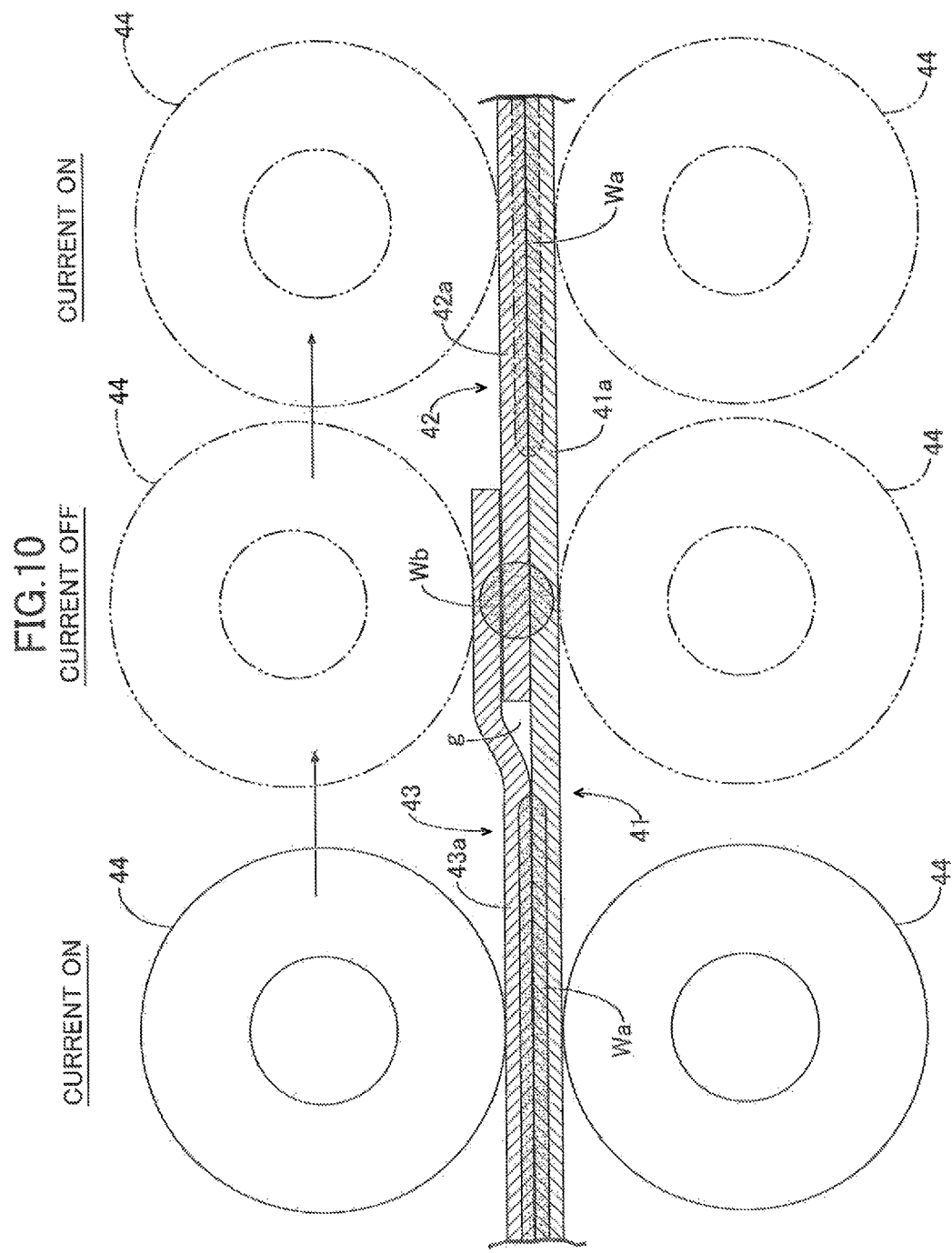

WELDED STRUCTURE FOR VEHICLE BODY PANEL

TECHNICAL FIELD

The present invention relates to a welded structure for a vehicle body panel in which joining flanges formed along edges of the vehicle body panels are superimposed and joined by welding.

BACKGROUND ART

For example, as described in Patent Document 1 below, conventionally known seam welding is carried out by holding the surfaces of superimposed steel sheets between a pair of roller electrodes, applying pressure thereto, and rolling the two roller electrodes along the surfaces of the steel sheets while supplying current thereto, thus melting the steel sheets held between the two roller electrodes by virtue of Joule heating to carry out continuous welding.

Furthermore, Patent Document 2 below describes an arrangement in which, when forming two closed cross-sections by disposing a reinforcement between an outer member and an inner member, two joining flanges of the outer member and two joining flanges of the inner member are laser welded by means of two weld lines, and two joining flanges of the outer member and opposite edges of the reinforcement are laser-welded by means of two other weld lines.

RELATED ART DOCUMENTS

Patent Documents

Patent Document 1: Japanese Patent Application Laid-open No. 2007-167895
Patent Document 2: Japanese Patent Application Laid-open No. 2009-255800

SUMMARY OF THE INVENTION

Problems to be Solved by the Invention

Among the various types of resistance welding, spot welding involves welding steel sheets in a spot manner, whereas seam welding involves welding steel sheets in a linear manner, and compared with spot welding there is the advantage that the efficiency of the welding operation improves. However, in conventional seam welding it is possible to weld two steel sheets or three thin steel sheets in a superimposed state, but it is difficult to weld three or more sheets that include a thick sheet in a superimposed state.

In order to solve this problem, forming cutouts in turn in one of three or more steel sheets that include a thick sheet to thus carry out seam welding by lowering the number of superimposed steel sheets to a weldable two or three could be considered. However, by so doing, since a cutout is formed in at least one sheet of the three or more steel sheets that include a thick sheet, there is the problem that the weld strength inevitably decreases for that part.

Furthermore, applying the invention described in Patent Document 2 above to seam welding such that three or more steel sheets, including a thick sheet, are superimposed while displacing them so that the number of superimposed sheets is within the number that can be welded and welding these steel sheets by two parallel weld lines could be considered. However, by so doing, not only does the number of steps required for seam welding double, but it is also necessary to employ two parallel weld lines, the width of the joining flanges increases and, moreover, there is the problem that one of the weld lines is at a position far from the closed cross-section portion and the peel-off strength of the welded part decreases.

The present invention has been accomplished in light of the above circumstances, and it is an object thereof to achieve a balance between improvement of welding speed and improvement of peel-off strength when joining by welding joining flanges of a plurality of panels that are superimposed.

Means for Solving the Problems

In order to attain the above object, according to a first aspect of the present invention, there is provided a welded structure for a vehicle body panel in which a second joining flange formed along an edge of a second panel and a third joining flange formed along an edge of a third panel are superimposed on a first joining flange formed along an edge of a first panel, a seam weld is made using a roller electrode in at least one of a section in which the first joining flange and the second joining flange form two layers and a section in which the first joining flange and the third joining flange form two layers, and a spot weld is made in a section in which mutually opposing end parts of the second panel and the third panel overlap one another to form a gap portion or a step portion, and the first joining flange, the second joining flange and the third joining flange form three layers.

Further, according to a second aspect of the present invention, in addition to the first aspect, a flange width of a section in which there are two layers is smaller than a flange width of a section in which there are three layers.

Furthermore, according to a third aspect of the present invention, in addition to the first or second aspect, the spot weld has a nugget diameter that is larger than a nugget width of the seam weld.

Moreover, according to a fourth aspect of the present invention, in addition to any one of the first to third aspects, the first joining flange of the first panel is an upper flange of a side sill outer on an outer side of the vehicle body, the second joining flange of the second panel is an upper flange of a side sill inner on an inner side of the vehicle body, and the third joining flange of the third panel is an upper flange of a center pillar lower inner or a front pillar lower inner on the inner side of the vehicle body.

Further, according to a fifth aspect of the present invention, in addition to any one of the first to fourth aspects, the first joining flange of the first panel is a joining flange of a front pillar lower inner, the second joining flange of the second panel is a joining flange of a front pillar lower outer, the third joining flange of the third panel is a joining flange of a front pillar upper outer, a door hinge stiffener provided on a door opening part of the vehicle body is fixed to the joining flange of the front pillar upper outer and the joining flange of the front pillar lower outer, and the position of the spot weld is in the vicinity of the door hinge stiffener.

Furthermore, according to a sixth aspect of the present invention, in addition to any one of the first to fifth aspects, the seam weld is made by holding by means of two roller electrodes a joining section in which two joining flanges are superimposed, and rolling the two roller electrodes on a weld line while supplying current thereto, and in a section in which the spot weld has been made in advance in the first joining flange, the second joining flange, and the third joining flange as three layers, the current is merely cut off without moving the two roller electrodes away from the spot weld part, and after passing through the spot weld the current is supplied so as to resume the seam weld to thus join by the seam weld joining flanges along a peripheral edge of the door opening part of the vehicle body.

Moreover, according to a seventh aspect of the present invention, in addition to any one of the first to sixth aspects, a joining flange along a peripheral edge of a triangular window of the vehicle body is joined by the seam weld.

Effects of the Invention

In accordance with the first aspect of the present invention, the second joining flange formed along the edge of the second panel and the third joining flange formed along the edge of the third panel are superimposed on the first joining flange formed along the edge of the first panel and joined by welding. In this process, since a seam weld is made, using a roller electrode, in at least one of a section in which the first joining flange and the second joining flange form two layers and a section in which the first joining flange and the third joining flange form two layers, and in a section in which mutually opposing end parts of the second panel and the third panel overlap so as to form a gap or a step portion a spot weld is made in the first joining flange, the second joining flange, and the third joining flange as three layers, not only is it possible to enhance the production efficiency by increasing the welding speed by making a continuous seam weld with a long weld length in the section where there are two layers, but it is also possible to make the spot weld in the section where there are three layers, for which it is difficult to make the seam weld due to the large number of superimposed sheets even though the weld length is short and for which peel-off easily occurs when a collision load is inputted, thus enhancing the strength against peel-off and thereby achieving a balance between welding speed and weld strength. Moreover, since it is unnecessary to make a weld in a gap or a step portion formed in the vicinity of the part where the second joining flange and the third joining flange overlap, for which it is difficult to carry out seam welding, it is possible to prevent the production efficiency from decreasing.

Furthermore, in accordance with the second aspect of the present invention, since the flange width in the section in which there are two layers is smaller than the flange width in the section in which there are three layers, it is possible to cut the weight of the joining flange while ensuring a minimum necessary flange width for a seam weld, for which the nugget width is relatively small, and a minimum necessary flange width, for a spot weld for which the nugget diameter is relatively large.

Moreover, in accordance with the third aspect of the present invention, since the nugget diameter of the spot weld is larger than the nugget width of the seam weld, it is possible to enhance the weld strength for the spot weld, which would be the starting point for peel-off of the seam weld, thus enhancing the peel-off strength of the entire welded part.

Furthermore, in accordance with the fourth aspect of the present invention, since the first joining flange of the first panel is the upper flange of the side sill outer on the outer side of the vehicle body, the second joining flange of the second panel is the upper flange of the side sill inner on the inner side of the vehicle body, and the third joining flange of the third panel is the upper flange of the center pillar lower inner or the front pillar lower inner on the inner side of the vehicle body, it is possible to reinforce effectively the lower part of the center pillar or the lower part of the front pillar, which are easily deformed by the collision load of a side collision, thereby preventing the welded part from peeling off.

Moreover, in accordance with the fifth aspect of the present invention, since the first joining flange of the first panel is the joining flange of the front pillar lower inner, the second joining flange of the second panel is the joining flange of the front pillar lower outer, the third joining flange of the third panel is the joining flange of the front pillar upper outer, the door hinge stiffener provided on the door opening part of the vehicle body is fixed to the joining flange of the front pillar upper outer and the joining flange of the front pillar lower outer, and the position of the spot weld is in the vicinity of the door hinge stiffener, it is possible to reinforce effectively the vicinity of the door hinge stiffener.

Furthermore, in accordance with the sixth aspect of the present invention, since seam welding is carried out by holding by means of the two roller electrodes the joined section in which two joining flanges are superimposed, and rolling the two roller electrodes on a weld line while supplying current thereto, and in the section in which the first joining flange, the second joining flange, and the third joining flange are spot welded in advance as three layers, the current is merely cut off without moving the two roller electrodes away from the spot welded part, and after passing through the spot weld part the current is supplied so as to resume the seam weld to thus join by the seam weld the joining flanges along the peripheral edge of the door opening part of the vehicle body, it is possible to enhance the strength of the peripheral edge of the door opening part to thus enhance the torsional rigidity of the vehicle body, thus cutting down on the reinforcing member for that section and achieving a reduction in weight. Moreover, it becomes unnecessary to move the roller electrode away from the joining flange each time, and not only does the production efficiency increase, but it is also possible to prevent sputtering when the roller electrode passes through the section in which the joining flanges form three layers, thereby avoiding any degradation of weld quality.

Furthermore, in accordance with the seventh aspect of the present invention, since the joining flange along the peripheral edge of the triangular window of the vehicle body is joined by a seam weld, it is possible to enhance the strength of the vicinity of the triangular window.

BRIEF DESCRIPTION OF DRAWINGS

FIG. 10 is a diagram for explaining seam welding by means of a roller electrode. (first Embodiment)

EXPLANATION OF REFERENCE NUMERALS AND SYMBOLS

Figure 1:
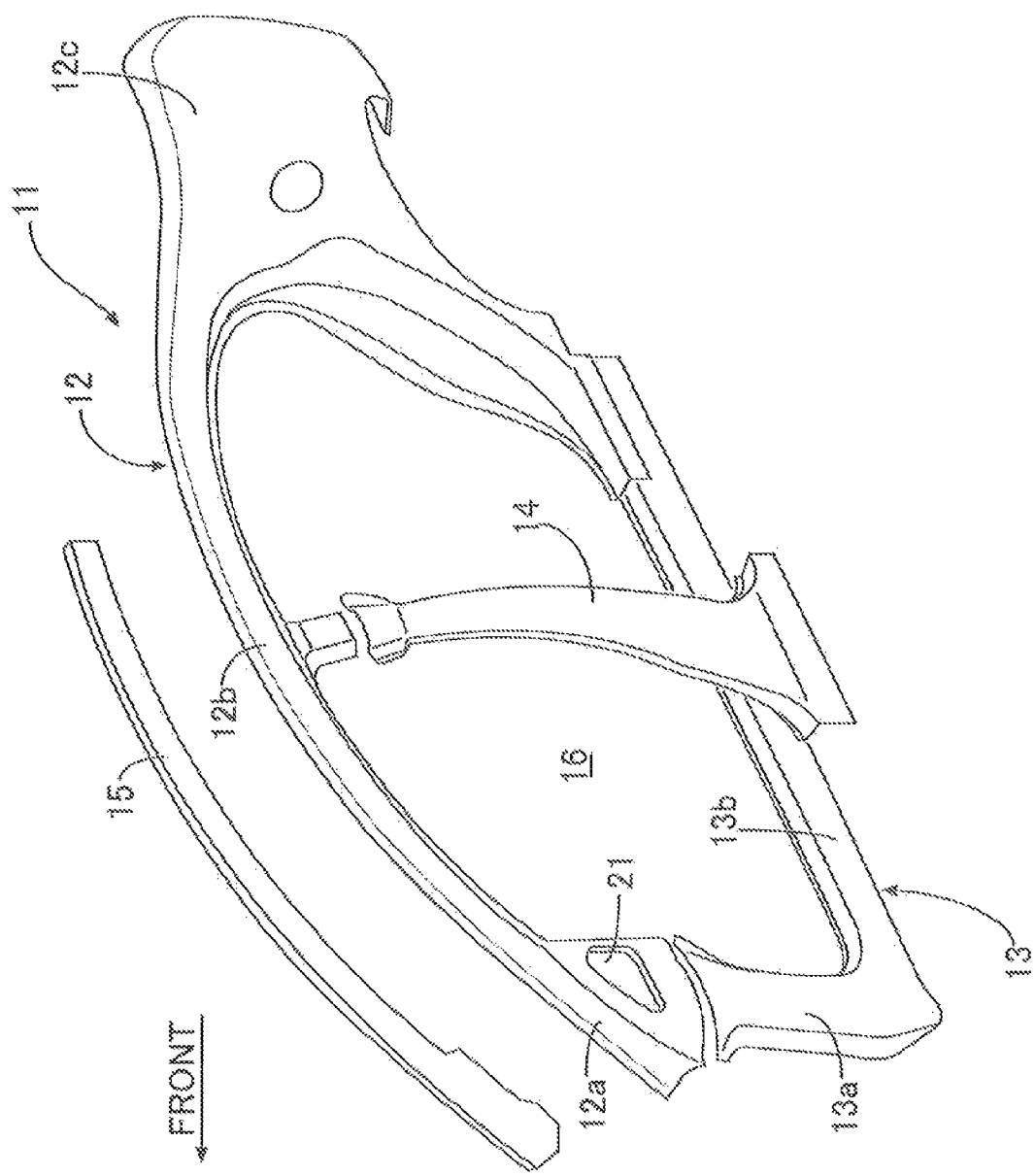
FIG. 1 is an exploded perspective view of a left-hand side outer panel of a vehicle body viewed from outside a vehicle compartment. (first embodiment)

12a Front pillar upper outer
13a Front pillar lower outer
13b Side sill outer
16 Door opening part
17 Front pillar lower inner
18 Side sill inner
19 Center pillar lower inner
21 Triangular window
34 Door hinge stiffener
41 First panel
41a First joining flange
42 Second panel
42a Second joining flange
43 Third panel
43a Third joining flange
44 Roller electrode
Wa Seam weld
Wb Spot weld
d Nugget diameter
f6 Joining flange
f7 Joining flange
f9 Joining flange
g Gap part
w Nugget width

MODES FOR CARRYING OUT THE INVENTION

A first embodiment of the present invention is explained below by reference to FIG. 1 to FIG. 10.

First Embodiment

Figure 8:
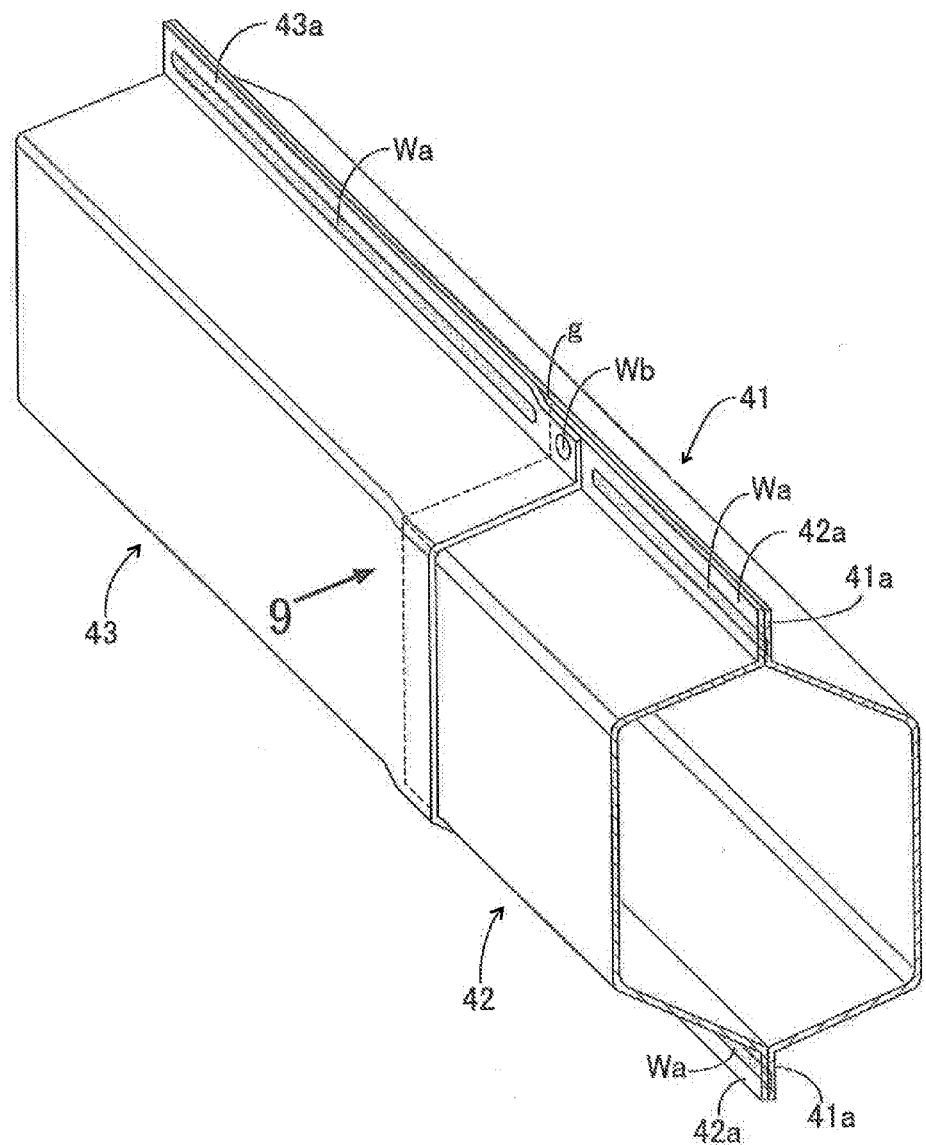
FIG. 8 is a perspective view showing joined parts of first to third panels. (first embodiment)

The welded structure of the present embodiment is first explained by reference to FIG. 8 to FIG. 10.

The present embodiment is applied to a section in which a first panel 41, a second panel 42, and a third panel 43 are joined by welding; the first panel 41, which has a hat-shaped cross section, includes a pair of first joining flanges 41a and 41a along opposite edges, the second panel 42, which has a hat-shaped cross section, includes a pair of second joining flanges 42a and 42a along opposite edges, and the third panel 43, which has a hat-shaped cross section, includes a pair of third joining flanges 43a and 43a along opposite edges.

The second panel 42 and the third panel 43 are disposed in series in the longitudinal direction, and in a state in which mutually opposing end parts thereof overlap one another, the second joining flanges 42a and 42a of the second panel 42 and the third joining flanges 43a and 43a of the third panel 43 are superimposed on the first joining flanges 41a and 41a of the first panel 41. A section in which the first joining flange 41a and the second joining flange 42a overlap as two layers and a section in which the first joining flange 41a and the third joining flange 43a overlap as two layers are joined by means of a seam weld Wa. Furthermore, in a section in which mutually opposing end parts of the second panel 42 and the third panel 43 overlap one another, the second joining flange 42a and the third joining flange 43a overlap the first joining flange 41a as three layers, and a spot weld Wb is made in this section.

The seam weld Wa is made by holding by means of two roller electrodes 44 and 44 a joining section in which two joining flanges overlap one another and rolling the roller electrodes 44 and 44 on a weld line while supplying current thereto (see FIG. 10). In a section in which the seam weld Wa is discontinued, that is, a joined section in which the joining flanges have had the spot weld Wb made in advance as three layers, the current is merely cut off without moving the roller electrodes 44 and 44 away from the joined section, and after passing through this joined section the current is again supplied to the roller electrodes 44 and 44 to thus resume the seam weld Wa, thereby maintaining high production efficiency and preventing the weld quality from being degraded due to sputtering when the roller electrodes 44 and 44 pass through a step of the joined section.

Furthermore, in a section in which the third joining flange 43a overlaps the second joining flange 42a on the outer side, it bends outwardly by a portion corresponding to the plate thickness of the second joining flange 42a, and in the bent portion a gap g is formed between the first joining flange 41a and the third joining flange 43a, but the seam weld Wa terminates before the gap g without welding it. Furthermore, a nugget diameter d of the spot weld Wb is set so as to be larger than a nugget width w of the seam weld Wa.

Although it is difficult to carry out seam welding Wa in a section in which the joining flanges form three layers due to the plate thickness being too large, it is possible for sufficient weld strength to be exhibited by making a seam weld Wa in a section in which the joining flanges form two layers. Furthermore, since the length of the section in which the joining flanges form two layers is much longer than the length of the section in which the joining flanges form three layers, it is possible, by making in this section the seam weld Wa, which has a high welding speed, to enhance the workability, thereby improving the production efficiency.

Furthermore, in the section in which the joining flanges form three layers and the plate thickness is large, joining can be reliably carried out by making the spot weld Wb therein. Moreover, since it is easy to increase the nugget diameter d for the spot weld Wb compared with the seam weld Wa, it is possible to enhance the peel-off strength of the entire welded part by strongly joining by means of the spot weld Wb the end parts of the panels, which would be a starting point for weld peel-off.

Furthermore, when there is a gap g between the joining flanges, it is difficult to make the seam weld Wa in such a section, but since the tip of the seam weld Wa terminates before the gap g it is possible to prevent the production efficiency from decreasing.

As hereinbefore described, not only is it possible to enhance the production efficiency by increasing the welding speed by making the seam weld Wa, which is continuous, in the section where two layers are joined and a long weld length is required, but it is also possible to make the spot weld Wb in the section with three layers, for which it is difficult to make the seam weld Wa due to the large number of superimposed sheets even though the weld length is short and for which peel-off easily occurs when a collision load is inputted due to it being positioned in an end part of the joining flange, thus enhancing the strength and increasing the resistance to peel-off. Therefore, in accordance with the present embodiment, it is possible to achieve a balance between welding speed and weld strength.

An example in which the welded structure of the present invention is applied to an assembly of a vehicle body side part of an automobile is now explained by reference to FIG. 1 to FIG. 7.

As shown in FIG. 1, a side outer panel 11 on the left side of the vehicle body of an automobile is formed as a sub-assembly by welding in advance a side outer panel upper 12 integrally having a front pillar upper outer 12a, a roof side rail outer 12b, and a rear quarter panel 12c, a side outer panel lower 13 integrally having a front pillar lower outer 13a and a side sill outer 13b, a center pillar outer 14 connecting the roof side rail outer 12b and the side sill outer 13b, and a roof side rail stiffener 15 superimposed on the inner side of the front pillar upper outer 12a and the roof side rail outer 12b.

With regard to a part of the roof side rail stiffener 15 joined to the front pillar upper outer 12a and the roof side rail outer 12b of the side outer panel upper 12, a part of the center pillar outer 14 joined to the roof side rail outer 12b of the side outer panel upper 12, a part of the front pillar lower outer 13a of the side outer panel lower 13 joined to the front pillar upper outer 12a of the side outer panel upper 12, and a part of the center pillar outer 14 joined to the side sill outer 13b of the side outer panel lower 13, the panels form two layers.

Figure 2:
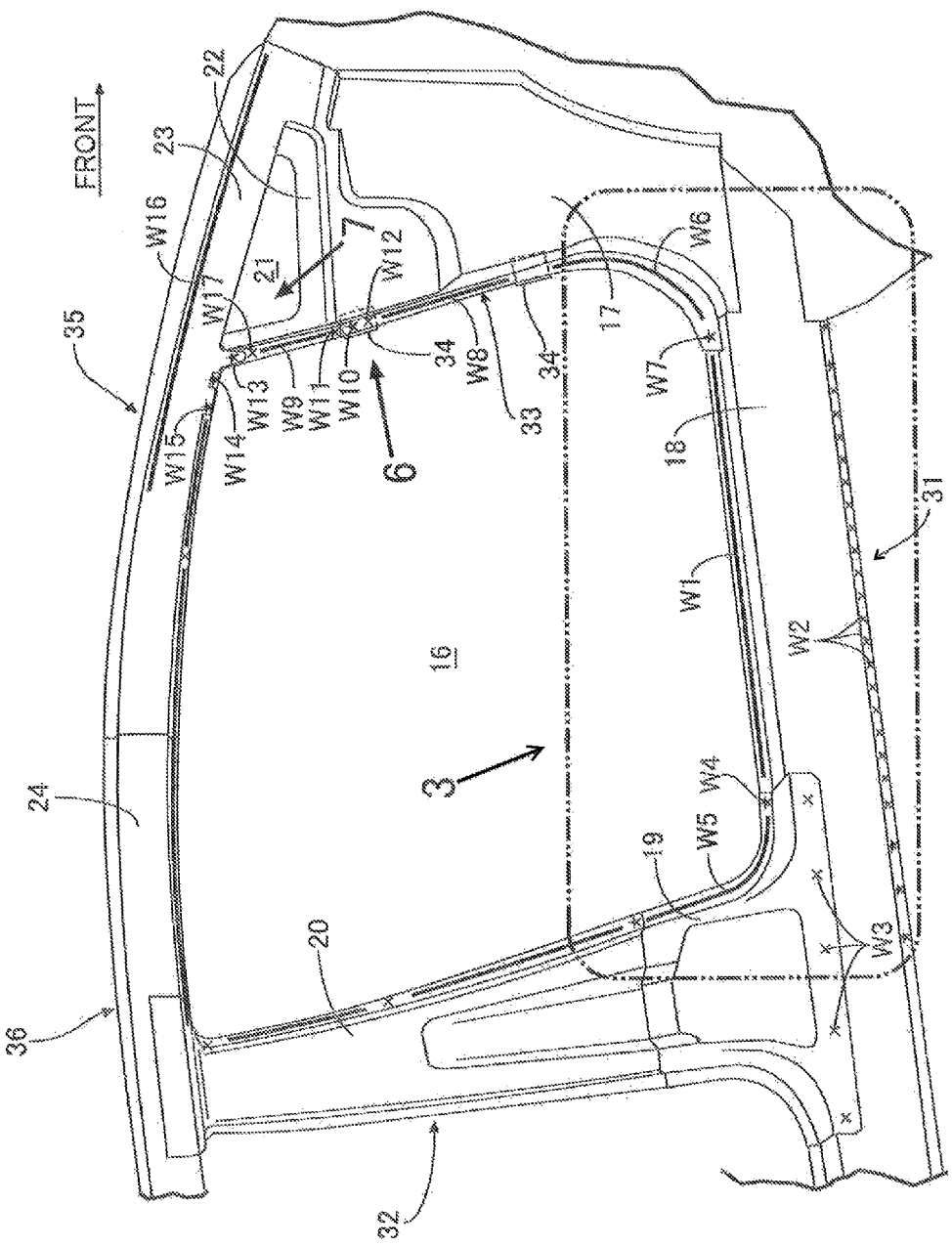
FIG. 2 is a perspective view of an area around a left door opening part of the vehicle body viewed from inside the vehicle compartment. (first embodiment)

FIG. 2 is a view of a door opening part 16 on the front left side of the vehicle body of an automobile viewed from inside the vehicle body and shows each panel joined to an inner face of the side outer panel 11. That is, a front pillar lower inner 17 is joined to an inner face of the front pillar lower outer 13a of the side outer panel lower 13, and a side sill inner 18 is joined to an inner face of the side sill outer 13b of the side outer panel lower 13. Furthermore, a center pillar lower inner 19 is joined to a lower inner face of the center pillar outer 14, and a center pillar upper inner 20 is joined to an upper inner face of the center pillar outer 14. Moreover, a triangular window frame 22 is joined to an inner face of the periphery of a triangular window 21 beneath the front pillar upper outer 12a of the side outer panel upper 12. A front pillar upper inner 23 is joined to an inner face of the front pillar upper outer 12a, and a roof rail inner 24 is joined to an inner face of the roof side rail outer 12b.

Figure 3:
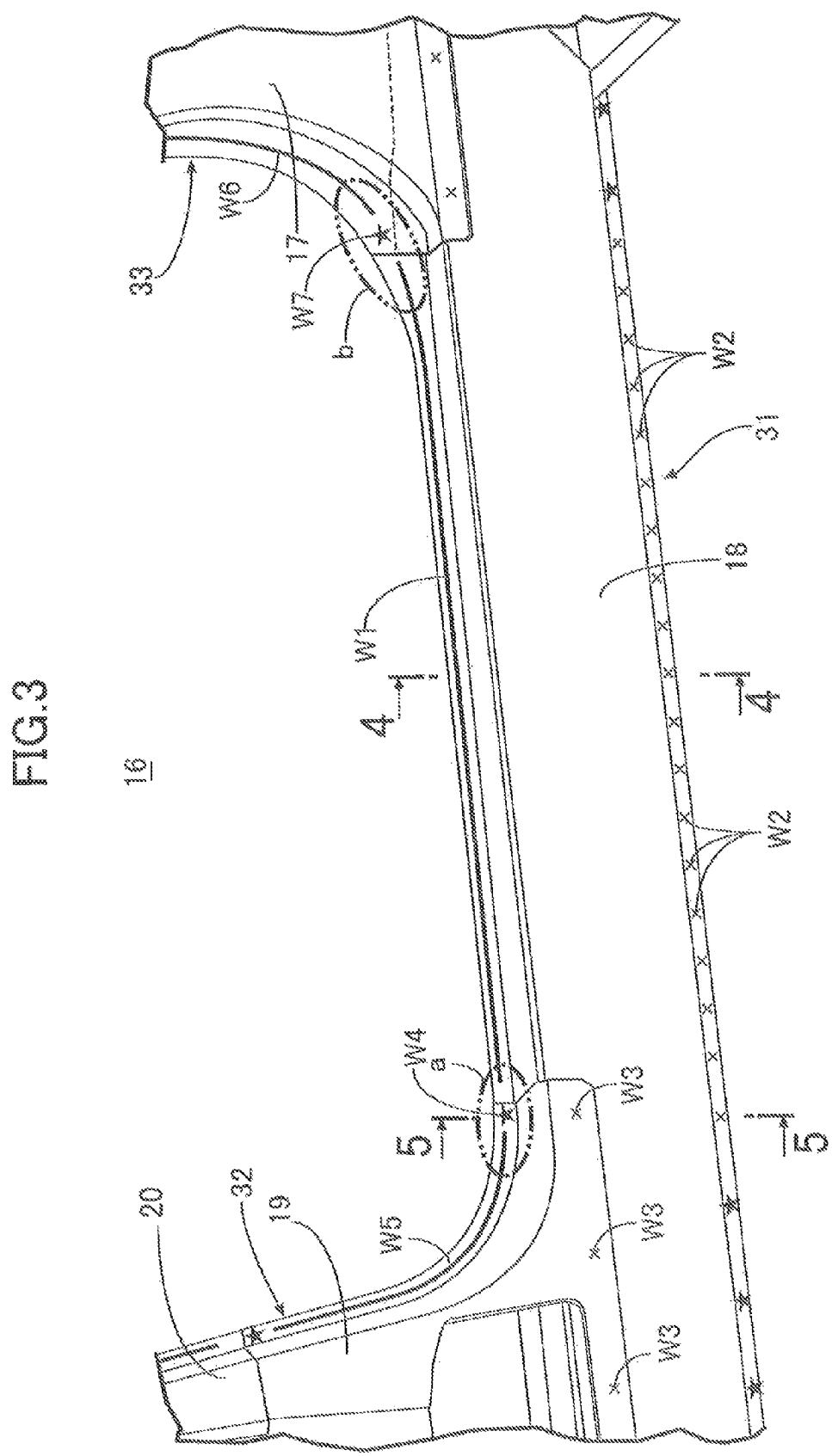
FIG. 3 is an enlarged view of part 3 in FIG. 2. (first embodiment)
Figure 4:
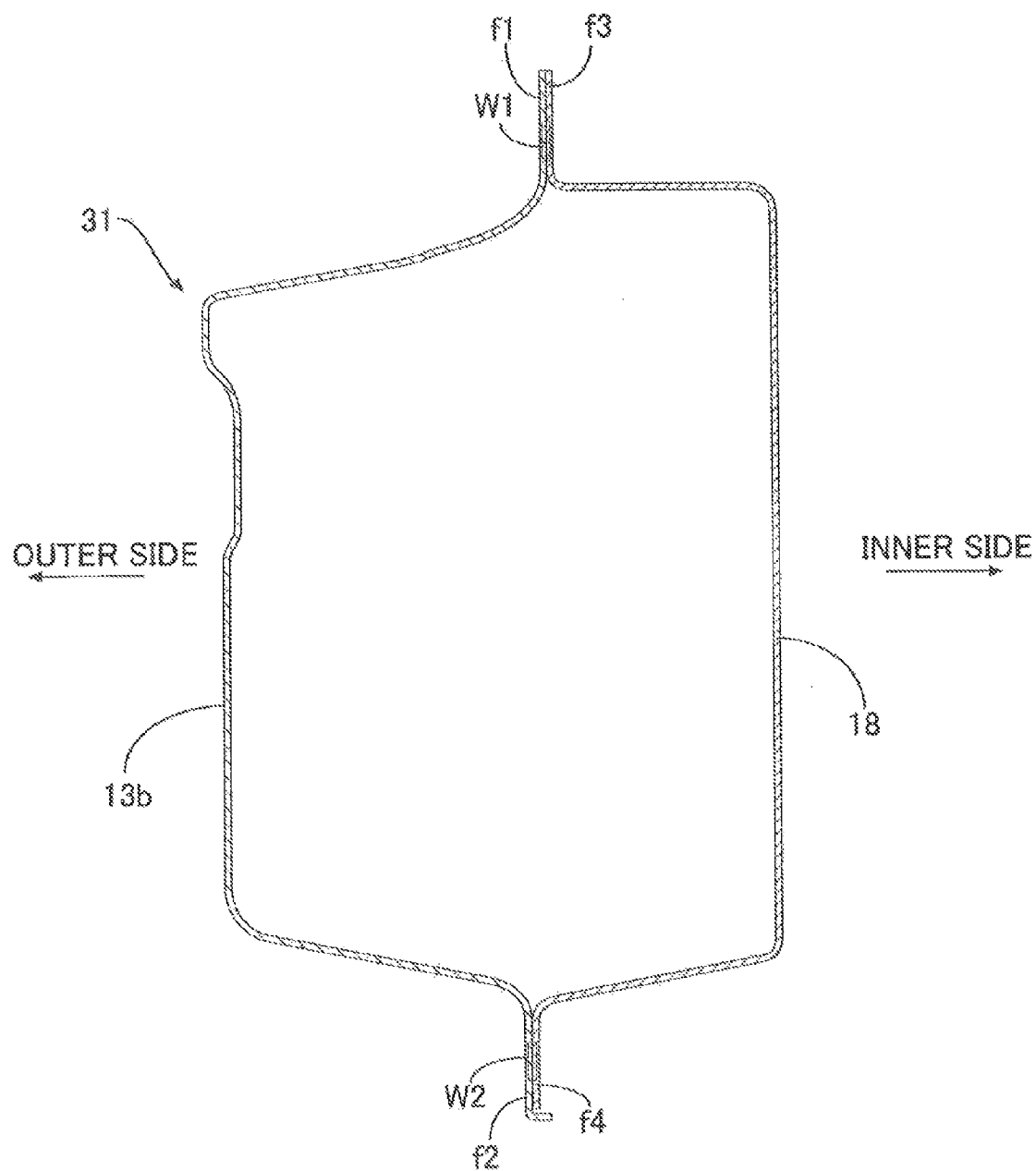
FIG. 4 is an enlarged sectional view along line 4-4 in FIG. 3. (first embodiment)
Figure 7:
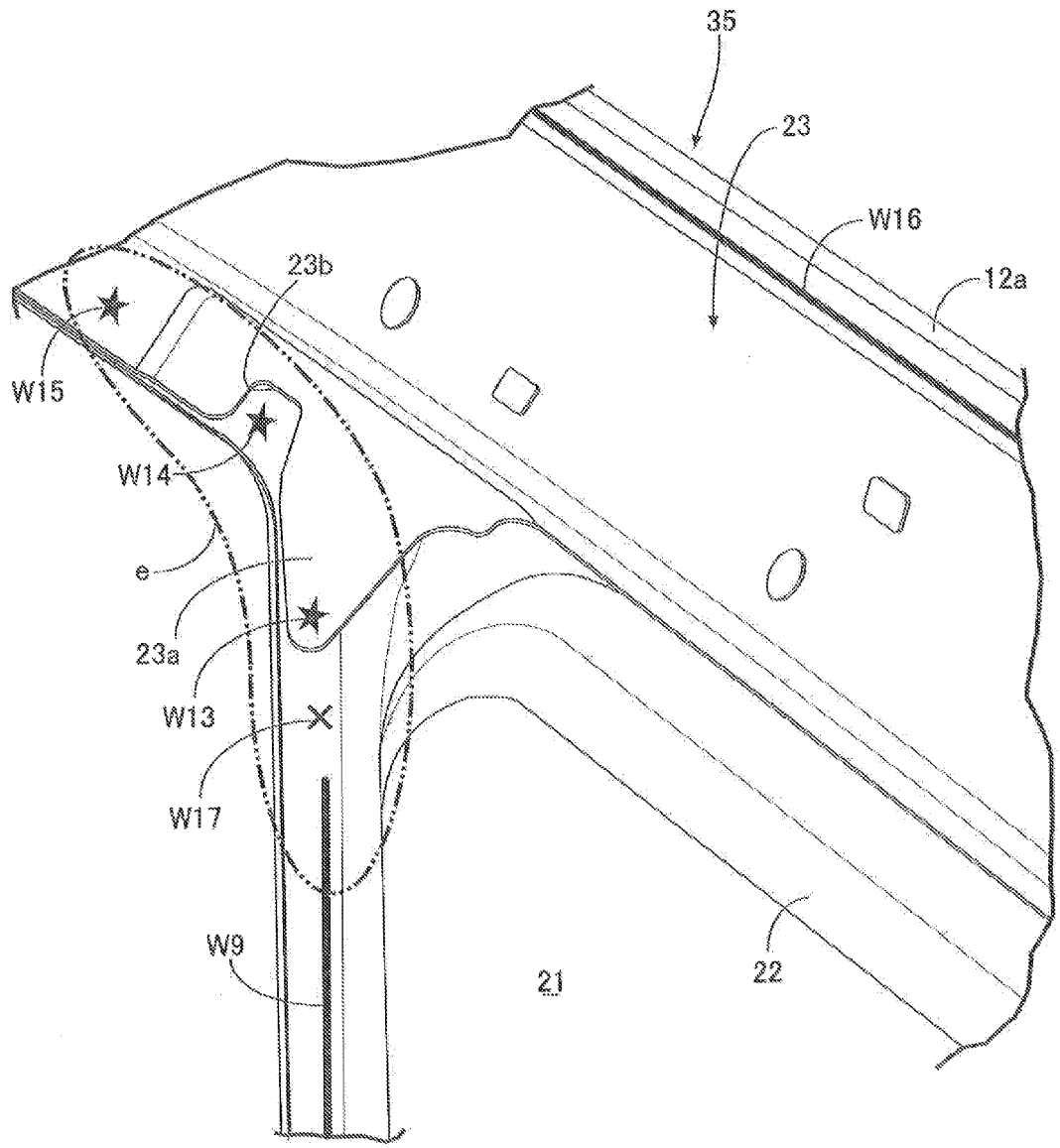
FIG. 7 is an enlarged view in the direction of arrow 7 in FIG. 2. (first embodiment)

As shown in FIG. 3 and FIG. 4, a side sill 31 beneath the door opening part 16 is formed so as to have a closed cross-section while having upper and lower joining flanges f1 and f2 of the side sill outer 13b of the side outer panel lower 13 on the outer side and upper and lower joining flanges f3 and f4 of the side sill inner 18 on the inner side as two layers. In this arrangement, the upper flange f1 of the side sill outer 13b along the door opening part 16 and the upper flange f3 of the side sill inner 18 are as two layers with a seam weld W1, but the lower flange f2 of the side sill outer 13b and the lower flange f4 of the side sill inner 18 are welded with a spot weld W2. In FIG. 2, FIG. 3, and FIG. 7, a section that is subjected to seam welding is denoted by a bold solid line, a section that is subjected to spot welding as three layers is marked by , and a section that is subjected to spot welding as two layers is marked by x.

Figure 5:
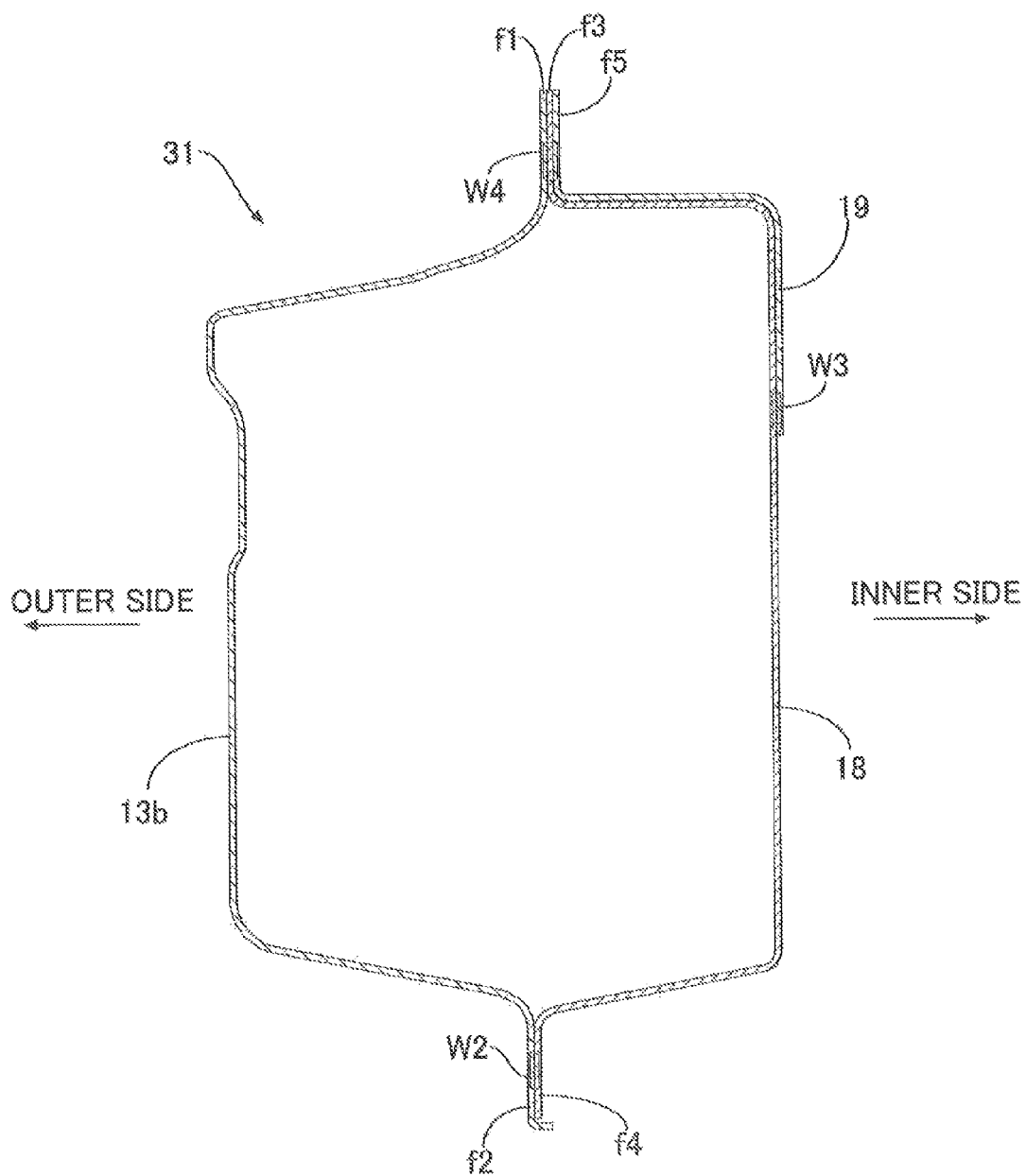
FIG. 5 is an enlarged sectional view along line 5-5 in FIG. 3. (first embodiment)

As shown in FIG. 3 and FIG. 5, in a section in which the side sill 31 is connected to the lower end of a center pillar 32, the upper inner face of the side sill inner 18 and the lower inner face of the center pillar lower inner 19 are superimposed and welded with a spot weld W3. The joining flange f1 of the side sill outer 13b, the joining flange f3 of the side sill inner 18, and a joining flange f5 of the center pillar lower inner 19 are superimposed, and these joining flanges f1, f3, and f5 are welded as three layers with a spot weld W4.

Furthermore, in a lower part of the center pillar 32, the joining flange of the center pillar lower inner 19 and a joining flange of the center pillar outer 14 are welded as two layers with a seam weld W5.

As hereinbefore described, in an area a circled by a chain line in FIG. 3, the seam welds W1 and W5 for two layers are present adjacent to the spot weld W4 for three layers, and the welded structure of the present invention is thus applied.

In the same way as for the lower end of the center pillar 32, which is described above, at the lower end of the front pillar 33 also, in an area b circled by a chain line in FIG. 3, a spot weld W7 for the three layers of the side sill outer 13b, the side sill inner 18, and the front pillar lower inner 17 is present between the seam weld W1 for the two layers of the side sill outer 13b and the side sill inner 18 and a seam weld W6 for the two layers of the front pillar lower outer 13a and the front pillar lower inner 17, and the welded structure of the present invention is thus applied.

As hereinbefore described, the lower part of the center pillar 32 and the lower part of the front pillar 33 would be easily deformed by means of the collision load of a side collision, but it is possible by welding the parts with the welded structure of the present invention to enhance the strength and prevent the welded part from peeling off when involved in a collision.

As shown in FIG. 2, upper and lower door hinge stiffeners 34 and 34 are provided on a front edge part of the door opening part 16, and the front pillar upper outer 12a and the front pillar lower outer 13a on the outer side of the vehicle body and the triangular window frame 22 and the front pillar lower inner 17 on the inner side of the vehicle body come together in the vicinity of the door hinge stiffener 34 on the upper side.

Figure 6:
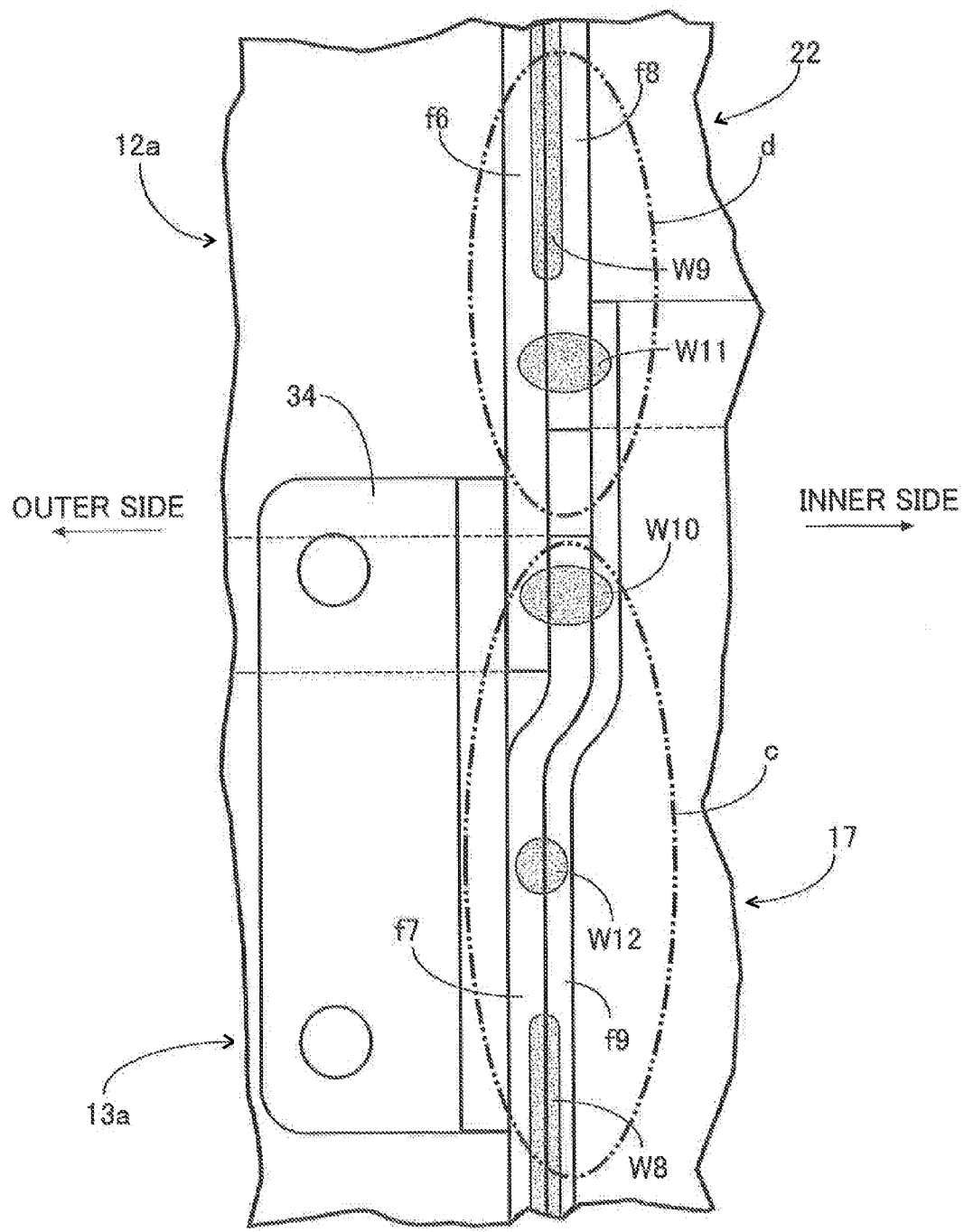
FIG. 6 is an enlarged view in the direction of arrow 6 in FIG. 2. (first embodiment)

As shown in FIG. 6, which is a view in the direction of arrow 6 in FIG. 2, a seam weld W8 is made in a section in which a joining flange f7 of the front pillar lower outer 13a and a joining flange f9 of the front pillar lower inner 17 are superimposed as two layers, and a seam weld W9 is made in a section in which a joining flange f6 of the front pillar upper outer 12a and a joining flange f8 of the triangular window frame 22 are superimposed as two layers. Furthermore, a spot weld W10 is made in a section in which the joining flange f7 of the front pillar lower outer 13a, the joining flange f9 of the front pillar lower inner 17, and the joining flange f6 of the front pillar upper outer 12a are superimposed as three layers, and a spot weld W11 is made in a section in which the joining flange f6 of the front pillar upper outer 12a, the joining flange f8 of the triangular window frame 22, and the joining flange f9 of the front pillar lower inner 17 are superimposed as three layers.

Moreover, between the seam weld W8 and the spot weld W10, a section in which the joining flange f7 of the front pillar lower outer 13a and the joining flange f9 of the front pillar lower inner 17 are superimposed as two layers is subjected to a supplementary spot weld W12. The upper door hinge stiffener 34 is fixed by welding to the joining flange f6 of the front pillar upper outer 12a and the joining flange f7 of the front pillar lower outer 13a.

As hereinbefore described, in an area c circled by a chain line in FIG. 6, the seam weld W8 for two layers is present so as to be adjacent to the spot weld W10 for three layers, in an area d circled by a chain line in FIG. 6, the seam weld W9 for two layers is present so as to be adjacent to the spot weld W11 for three layers, and the welded structure of the present invention is thus applied.

In this way, it is possible, by applying the welded structure of the present invention to the vicinity of the door hinge stiffener 34 to which a large load is applied, to enhance the rigidity with which the door hinge stiffener 34 is mounted on the vehicle body.

As shown in FIG. 2 and FIG. 7, above the triangular window 21, the front pillar upper inner 23, the triangular window frame 22, the roof side rail stiffener 15, and the front pillar upper outer 12a are superimposed from the inner side of the vehicle body toward the outer side of the vehicle body. Although the roof side rail stiffener 15 is shown in FIG. 1, it is hidden behind the front pillar upper inner 23 and the triangular window frame 22 in FIG. 2 and FIG. 7. With regard to the front pillar upper outer 12a positioned on the outermost side of the vehicle body, only part thereof is exposed upwardly from the upper edge of the front pillar upper inner 23.

Above the seam weld W9 for the two layers of the triangular window frame 22 and the front pillar upper outer 12a, a projecting portion 23a formed on the front pillar upper inner 23, the triangular window frame 22, and the front pillar upper outer 12a are welded as three layers with a spot weld W13. Thereabove, so as to face a cutout 23b formed in the front pillar upper inner 23, the triangular window frame 22, the roof side rail stiffener 15 (see FIG. 1), and the front pillar upper outer 12a are welded as three layers with a spot weld W14. Above and to the rear thereof, the front pillar upper inner 23, the roof side rail stiffener 15 (see FIG. 1), and the front pillar upper outer 12a are welded as three layers with a supplementary spot weld W15.

Furthermore, at the upper edge of a front pillar upper 35, the front pillar upper inner 23 and the front pillar upper outer 12a are welded as two layers with a seam weld W16. Moreover, between the seam weld W9 and the spot weld 13, the triangular window frame 22 and the front pillar upper outer 12a are welded as two layers with a supplementary spot weld W17.

As hereinbefore described, in an area e circled by a chain line in FIG. 7, the seam weld W9 for two layers is present so as to be adjacent to the spot welds W13, W14, and W15 for three layers, and the welded structure of the present invention is thus applied. This enables the vehicle body strength of the vicinity of the triangular window 21 to be enhanced.

A second embodiment of the present invention is explained by reference to FIG. 11.

Second Embodiment

Figure 9A:
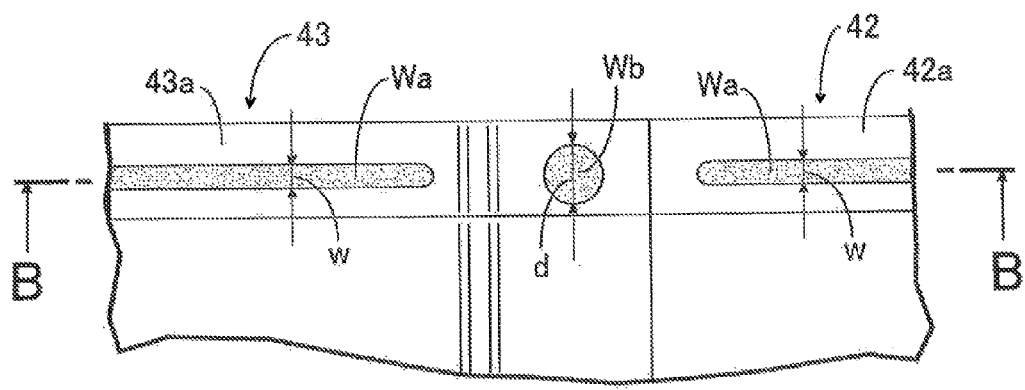
FIG. 9 is a view in the direction of arrow 9 in FIG. 8. (first embodiment)
Figure 9B:
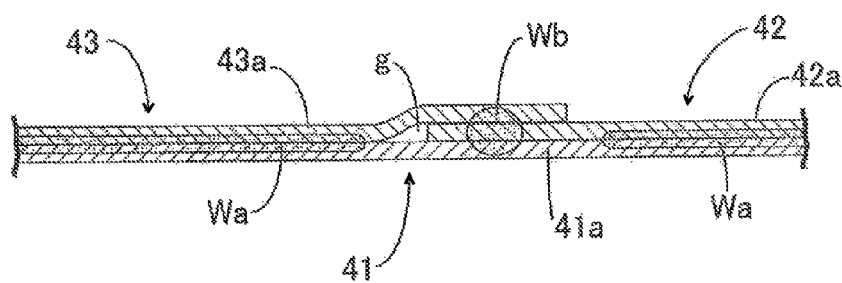
Figure 11:
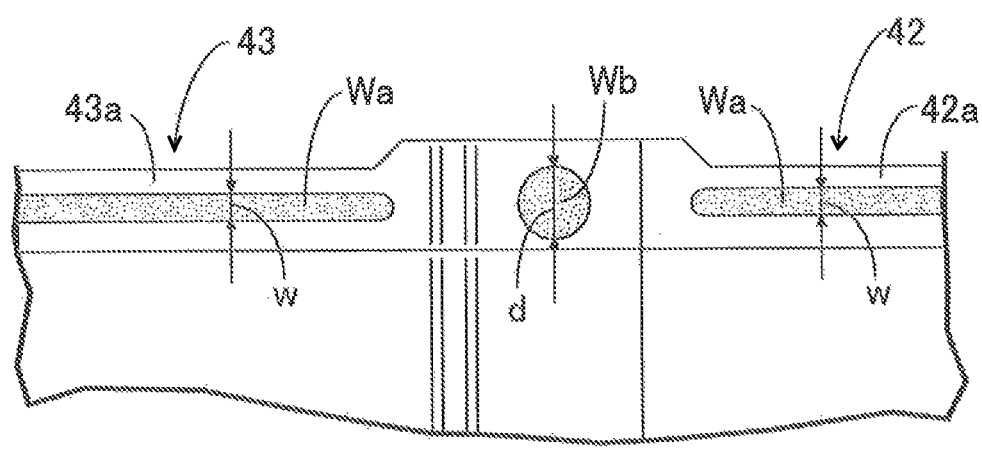
FIG. 11 is a view corresponding to FIG. 9. (second embodiment)

In the first embodiment shown in FIG. 9, the first to third joining flanges 41a to 43a of the first to third members 41 to 43 have a constant flange width in the longitudinal direction, but in a second embodiment shown in FIG. 11, the flange width of first to third joining flanges 41a to 43a is large in a section for three layers and small in a section for two layers.

This enables the flange width from becoming unnecessarily large and thus contributes to a reduction in weight while ensuring a flange width necessary for a spot weld Wb where a nugget diameter d is large and a seam weld Wa where a nugget width w is small.

Embodiments of the present invention are explained above, but the present invention may be modified in a variety of ways as long as the modifications do not depart from the spirit and scope thereof.

For example, in the present invention it is not always necessary for the seam weld Wa for two layers to be present on both of the opposite sides of the spot weld Wb for three layers, and the seam weld Wa for two layers may be present on one side of the spot weld Wb.

Furthermore, in the embodiment the present invention is applied to welding of the peripheral edge of the door opening part 16 of a vehicle, but the present invention may be applied to welding of any other position of a vehicle.

The invention claimed is:

1. A welded structure for a vehicle body panel in which a second joining flange formed along an edge of a second panel, and a third joining flange formed along an edge of a third panel are superimposed on a first joining flange formed along an edge of a first panel,
   a first seam weld is made using a roller electrode in a first section in which the first joining flange and the second joining flange are overlapped to form two layers, the first seam weld disposed substantially at a fixed distance in relation to a longitudinal edge of the first joining flange,
   a second seam weld is made using a roller electrode in a second section in which the first joining flange and the third joining flange are overlapped to form two layers, the second seam weld also disposed substantially at a fixed distance in relation to the longitudinal edge of the first joining flange, and
   a spot weld is made in an intermediate section situated between the first and second sections, in which:
   end parts of the second joining flange and the third joining flange overlap one another on a side of the second joining flange opposite the first joining flange and the third joining flange bends outwardly away from the first joining flange to form a gap portion or a step portion therebetween, and
   the first joining flange, the second joining flange and the third joining flange all overlap one another to form three layers.

2. The welded structure for a vehicle body panel according to Claim 1, wherein a flange width of a section in which there are two layers is smaller than a flange width of the intermediate section in which there are three layers.

3. The welded structure for a vehicle body panel according to Claim 2, wherein the spot weld has a nugget diameter that is larger than a nugget width of the seam weld.

4. The welded structure for a vehicle body panel according to Claim 1, wherein the spot weld has a nugget diameter that is larger than a nugget width of the seam weld.

5. The welded structure for a vehicle body panel according claim 1, wherein the first joining flange of the first panel is an upper flange of a side sill outer configured to be installed on an outer side of the vehicle body, the second joining flange of the second panel is an upper flange of a side sill inner configured to be installed on an inner side of the vehicle body, and the third joining flange of the third panel is an upper flange of a center pillar lower inner or a front pillar lower inner configured to be installed on the inner side of the vehicle body.

6. The welded structure for a vehicle body panel according to Claim 1, wherein the first joining flange of the first panel is a joining flange of a front pillar lower inner, the second joining flange of the second panel is a joining flange of a front pillar lower outer, the third joining flange of the third panel is a joining flange of a front pillar upper outer, a door hinge stiffener configured to be installed on a door opening part of the vehicle body is fixed to the joining flange of the front pillar upper outer and the joining flange of the front pillar lower outer, and the position of the spot weld is in the vicinity of the door hinge stiffener.

7. A method of manufacturing a vehicle body panel including the welded structure according to Claim 1, said method comprising the steps of:

spot-welding the intermediate section of the vehicle body panel in which the first, second and third joining flanges all overlap one another, making a first part of the seam weld by holding, by means of two roller electrodes, the first section in which the first and second joining flanges are superimposed, and rolling the two roller electrodes on a weld line while supplying current thereto, and when the two roller electrodes are moved in the intermediate section in which the spot weld has been made in advance in the first joining flange, the second joining flange, and the third joining flange as three layers, temporarily cutting off the current without moving the two roller electrodes away from the spot weld part, and after the roller electrodes have moved past the spot weld of the intermediate section, re-supplying the current so as to resume the seam weld to join the first and third joining flanges together at the second section.

8. The welded structure for a vehicle body panel according to Claim 1, wherein a joining flange, configured to be installed along a peripheral edge of a triangular window of the vehicle body, is joined by the seam weld.

* * * * *